United States Patent [19]

Parady

[11] Patent Number: 5,649,143
[45] Date of Patent: Jul. 15, 1997

[54] APPARATUS AND METHOD FOR PROVIDING A CACHE INDEXING SCHEME LESS SUSCEPTIBLE TO CACHE COLLISIONS

[75] Inventor: Bodo K. Parady, Danville, Calif.

[73] Assignee: Sun Microsystems, Inc., Mountain View, Calif.

[21] Appl. No.: 459,755

[22] Filed: Jun. 2, 1995

[51] Int. Cl.⁶ .................................................. G06F 12/00
[52] U.S. Cl. ............... 395/421.1; 395/403; 395/420; 395/421.02; 395/421.06; 395/445; 395/474; 364/DIG. 1
[58] Field of Search ................... 395/421.06, 421.02, 395/421.1, 403, 474, 420, 445

[56] References Cited

U.S. PATENT DOCUMENTS

| 5,379,393 | 1/1995 | Yang | 395/403 |
| 5,509,135 | 4/1996 | Steely, Jr. | 395/474 |

FOREIGN PATENT DOCUMENTS

| 94/03856 | 2/1994 | WIPO | 12/12 |

OTHER PUBLICATIONS

"Introducing a New Cache Design Into Vector Computers", Qing Yang, IEEE Transactions on Computers, vol. 42, No. 12, Dec. 1, 1993, pp. 1411–1424.

"A Case for Two–Way Skewed–Associative Caches", André Seznec, Proceedings of the Annual International Symposium on Computer Architecture, San Diego, May 16–19, 1993, No. Symp. 20 May 16, 1993, Institute of Electrical and Electronics Engineers, pp. 169–178.

*Primary Examiner*—Frank J. Asta
*Attorney, Agent, or Firm*—Blakely Sokoloff Taylor & Zafman LLP

[57] ABSTRACT

Logic circuitry and a corresponding method for computing an indexed set address utilized by a cache to mitigate the probability of a conflict miss occurring for a given memory access. Implemented at component or system level, the logic circuitry performs pseudo-random indexing of a set address obtained from a memory address during a memory access by a processor unit. This is accomplished by performing operations consistent with modulo operations on the memory address.

15 Claims, 8 Drawing Sheets

Access 1: First byte of a program located at address "01" of main memory

Access 2: 8,193rd byte of a program located at address "8,193" of main memory

Access 1: First byte of program located at address "01" of main memory.

Access 2: $(2^{20}+1)^{th}$ byte of program located at address "1,048,577" of main memory.

Access 3: $(2^{21}+1)^{th}$ byte of program located at address "2,097,153" of main memory.

Access 1: First byte of program located at address "01" of main memory.

Access 2: $(2^{20}+1)^{th}$ byte of program located at address "1,048,577" of main memory.

Access 3: $(2^{21}+1)^{th}$ byte of program located at address "2,097,153" of main memory

APPARATUS AND METHOD FOR PROVIDING A CACHE INDEXING SCHEME LESS SUSCEPTIBLE TO CACHE COLLISIONS

BACKGROUND OF THE INVENTION

1. Field of the Invention

The present invention relates to the field of caches. More particularly, the present invention relates to circuitry and a corresponding method for computing cache indexes of cache memory in order to avoid conflict misses.

2. Description of Related Art

It is well-known that the performance of a microprocessor system is influenced by the access time of system memory. Although the speed of semiconductor memories has improved over the last few years, the speed of main memory, comprising dynamic random access memory ("DRAM") devices, has not kept pace with the speed of processors. Consequently, when executing most applications, a processor would experience a number of "wait" states while main memory is being accessed to complete a read or write instruction.

In order to reduce the number of "wait" states, one typical solution is to employ a cache, including high-speed memory such as static random access memory ("SRAM") devices, within the microprocessor system. The cache may be implemented as a first level cache ("L1 cache"), a second level cache ("L2 cache") or any other well-known implementation. Substantially lesser in size (i.e., number of bytes) than main memory, cache is designed to improve overall system performance by providing faster access rates for retrieving data predicted to be the most commonly used.

It is well-known that a large percentage of caches perform mapping in accordance with a well-known indexing technique called "Bit-Selection". Depending on whether the cache is a "physical cache" or a "virtual cache", Bit-Selection produces a "set" address, otherwise known as a cache index, for indexing the cache memory by masking a selected number of bits of a physical address or by translating a virtual address, respectively. After being calculated, the set address is used to directly access a cache line of cache memory corresponding to the set address.

To better illustrate Bit-Selection, an example may be appropriate. In a microprocessor system providing 32-bit address lines "A[31:0]", 64 megabytes (MBytes) of main memory divided into 32-byte blocks and a physical cache including 1 MByte of cache memory divided into 32-byte cache lines, 27-bits of the 32-bit virtual address are translated to 21-bits of the physical address. Of these 21-bits of the physical address, 6-bits would be masked to provide a 15-bit set address for uniquely addressing each cache line of the cache. Preferably, the masking is performed on the most significant bits which, for this example, are bits A26–A20 of the physical address.

Although the Bit-Selection technique provides fast indexing of the cache memory due to its simplicity, it affords a number of disadvantages. One disadvantage associated with the Bit-Selection technique is that it is quite susceptible to conflict misses. One case is when a software application program is running multiple sub-routines in succession and these sub-routines are accessing similar parts of different pages in memory. If the program has more pages than are capable of being concurrently stored within the cache, there exists an increased likelihood of a conflict miss.

It is contemplated that majority of conflict misses arise from successive memory accesses separated by a common "stride". A "stride" is a measure of distance in bytes, words or any other bit representation between successive memory accesses. Normally, the stride remains as a power of two and generally constant. Thus, for a cache of size "Q", if the stride "R" possesses a large common co-factor (i.e., greatest common divisor) that is a large fraction of the cache size, a conflict miss causing eviction of the cache line would likely occur every "Q/R" memory accesses. For example, for a 1 MByte cache with a cache line of 32 bytes and a constant stride of 8 KBytes, the cache line would be evicted every 128 memory accesses. Another example, if the stride is equal to a multiple of the cache size, a conflict miss is guaranteed to occur every successive memory access after the first memory access.

Another disadvantage is that the Bit-Selection technique does not encourage uniformity in accessing each cache lines of cache memory with similar regularity. Such a non-uniform accessing technique increases the overall rate of cache collisions thereby reducing system performance the cache memory having to be reloaded more often. As a result, it would be advantageous to access each cache line with greater uniformity.

SUMMARY OF THE INVENTION

The present invention relates to logic circuitry and a corresponding method for providing a cache indexing scheme which reduces the probability of the cache experiencing a conflict miss during memory accesses. Implemented at a system or component level, the logic circuitry receives a memory address and performs operations having the same effect as conducting a well-known modulo operation on the memory address using a Mersenne pseudo-prime number "P", being the number of cache lines ("$2^k$") supported by cache minus one, as a modulus. These operations calculate an indexed set address which is used to access the cache memory.

To calculate the indexed set address, the logic circuitry is implemented to perform arithmetic operations between a least significant set bit of the set address and a least significant tag bit of the tag address, wherein the tag address is configured within the memory address to be more significant than the set address. Concurrent to this operation, arithmetic operations between the other bits of the set address and their corresponding tag bits are performed beginning with the next least significant set bit. These summed results form the entire indexed set address or the least significant bits of the indexed set address when the tag address has a lesser number of bits than the set address. In that case, the most significant set bits without any corresponding tag bits become the most significant bits of the indexed set address. It is contemplated that in lieu of performing arithmetic operations, addition by "Galios field of 2" (i.e., Exclusive-Or'ing) could be performed.

BRIEF DESCRIPTION OF THE DRAWINGS

The features and advantages of the present invention will become apparent from the following detailed description of the present invention in which:

FIG. 3b is a number of logic tables illustrating how the indexed set address for an arbitrarily chosen byte element is calculated for the system of FIG. 3a.

FIG. 4b is a number of logic tables illustrating how the indexed set address for an arbitrarily chosen byte element is calculated for the system of FIG. 4a.

DETAILED DESCRIPTION OF THE INVENTION

In the following detailed description, the present invention describes a circuitry and method for a cache indexing scheme which decreases the likelihood of a cache experiencing cache collisions, particularly conflict misses. Throughout this description, specific examples have been created for the sole purpose of explaining the indexing technique of the present invention. These specific examples should not be construed in any way as a limitation on the scope of the present invention. In some instances, however, well-known circuits or procedural steps have not been discussed in order to avoid unnecessarily obscuring the present invention.

For the scope of this application, a "sub-system" is defined as one or more hardware components used to perform a given operation. In addition, "data" may include binary data and/or instructions, both of which are generically referred to as "data" unless otherwise distinguished. A "memory address", a general reference for either a physical or virtual address, comprises at least a tag address and a set address, wherein the set address is stored in lesser significant bits of the memory address than the tag bits. Moreover, a "binary element" is generally defined as a predetermined number of bits processed in parallel (e.g., a "byte", "word" or "dword") while a "cache line" is addressable storage for one or more bytes, preferably 32-bytes in length.

Figure 1:
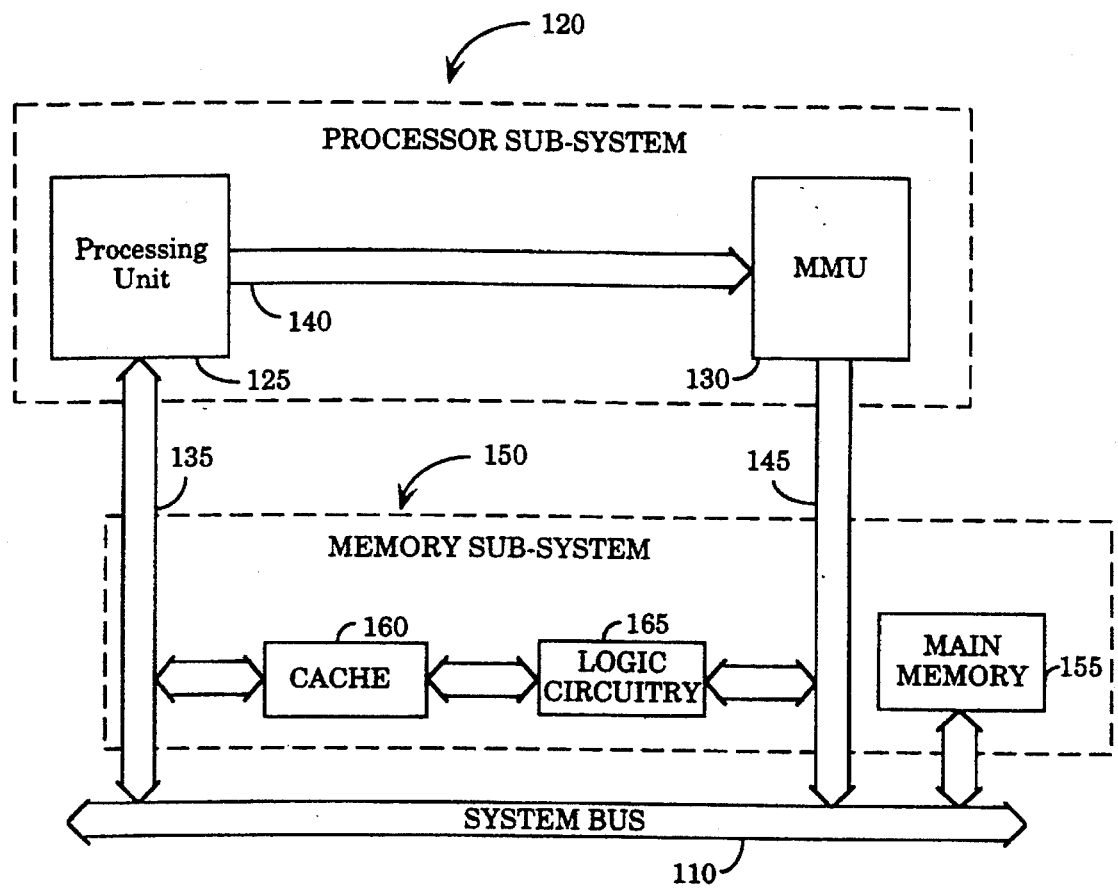
FIG. 1 is a block diagram of an illustrative embodiment of a microprocessor system comprising a processor sub-system and a memory sub-system including a cache and logic circuitry coupled between the cache and the processor sub-system to compute an indexed set address for accessing memory within the cache.

Referring to FIG. 1, an illustrative embodiment of the present invention implemented within a microprocessor system 100 is illustrated. The microprocessor system 100 comprises a system bus 110, including data, address and control bus lines preferably configured with bit widths of 128, 32 and 8 bits respectively. It is contemplated, however, that these above-listed bus lines may be configured with any desired bit width. The system bus 110 allows information (i.e., data, address and/or control) to be communicated between a plurality of sub-systems including, but not limited to, a processor sub-system 120 and a memory sub-system 150.

The processor sub-system 120 includes at least one processing unit 125 and a memory management unit ("MMU") 130. Although only one processing unit 125 is illustrated in this embodiment, it is contemplated that multiple processing units could be employed herein. The processing unit 125 is coupled to the system bus 110 through signal lines 135 to receive information from and transfer information to the memory sub-system 150. These signal lines 135 are shown as bi-directional lines but could be implemented as a pair of uni-directional lines.

The processing unit 125 is further coupled to the MMU 130 via signal lines 140. One function of the MMU 130 is to (i) receive a virtual address from the processing unit 125 through the signal lines 140 and thereafter, (ii) translate the virtual address into a physical address. After such translation, the MMU 130, which is coupled to the system bus 110 through the signal lines 145, transfers the physical address and necessary control information to the system bus 110 to be subsequently read by the memory sub-system 150.

The memory sub-system 150 includes a main memory unit 155 and a cache (e.g., a L2 cache) 160 having a storage capacity significantly less than the main memory unit 155. The cache 160 may be configured as a direct-mapped cache, a N-way set associative cache, a fully associative cache and the like. However, all of these types would at least comprise (i) a cache memory for storing data repeatedly executed or manipulated by the processing unit 125, (ii) a cache directory for storing "set" addresses represented in the cache memory and (iii) a cache controller for controlling cache memory to operate in accordance with prescribed cache policies.

For clarity sake, the description will describe focus on indexing of a direct-mapped cache which ensures that any memory locations in main memory are mapped to only one memory location of the cache memory requiring multiple memory locations in main memory to share a single memory location in the cache. Typical of most direct-mapped caches to avoid cache collisions, those memory locations of main memory separated by the cache size are designated to share the same memory location in cache. Thus, memory accesses separated by any multiple "m" of the cache size ("m"=1, 2, etc.) are mapped into the same cache line causing a line eviction.

The cache memory of the cache 160 is organized into a plurality of cache lines (not shown) wherein each consecutive cache line is accessed by a unique, consecutive "set" address. The "set address" is normally a sub-set of the memory address output from the processor sub-system 120. Although the cache 160 is further represented in FIG. 1 as a physical cache, it is contemplated that the cache 160 could be configured as a virtual cache requiring conversion of the virtual address, not the physical address, to access one of its cache lines.

In order to mitigate the likelihood of conflict misses and to modify incoming set addresses before being used by the cache 160, logic circuitry 165 may be employed at a component level (e.g., within the MMU 130 or cache 160) or at a system level. Illustrating the cache 160 as a physical cache employed at the system level, the logic circuitry 165 would be coupled to the output of the MMU 130, such as to signal line 145, in order to receive the physical address from the MMU 130. Upon receiving the physical address, the logic circuitry 165 performs arithmetic or logical operations on the physical address prior to producing an indexed set address. The indexed set address is transmitted into the cache 160 for indexing a desired cache line. Alternatively, if the cache is a virtual cache (not shown), the logic circuitry may also be implemented at a component or system level but is configured to receive the virtual address in lieu of the physical address.

Regardless of the type of cache employed within the microprocessor system 100, the logic circuitry 165 performs pseudo-randomization on the incoming set address of the memory address by offsetting the set address with the binary value of the tag bits as discussed below. This produces an indexed set address which is used by the cache 160 for conducting memory accesses to effectively lessen the probability of the cache 160 experiencing a conflict miss during the memory access.

Figure 2A:
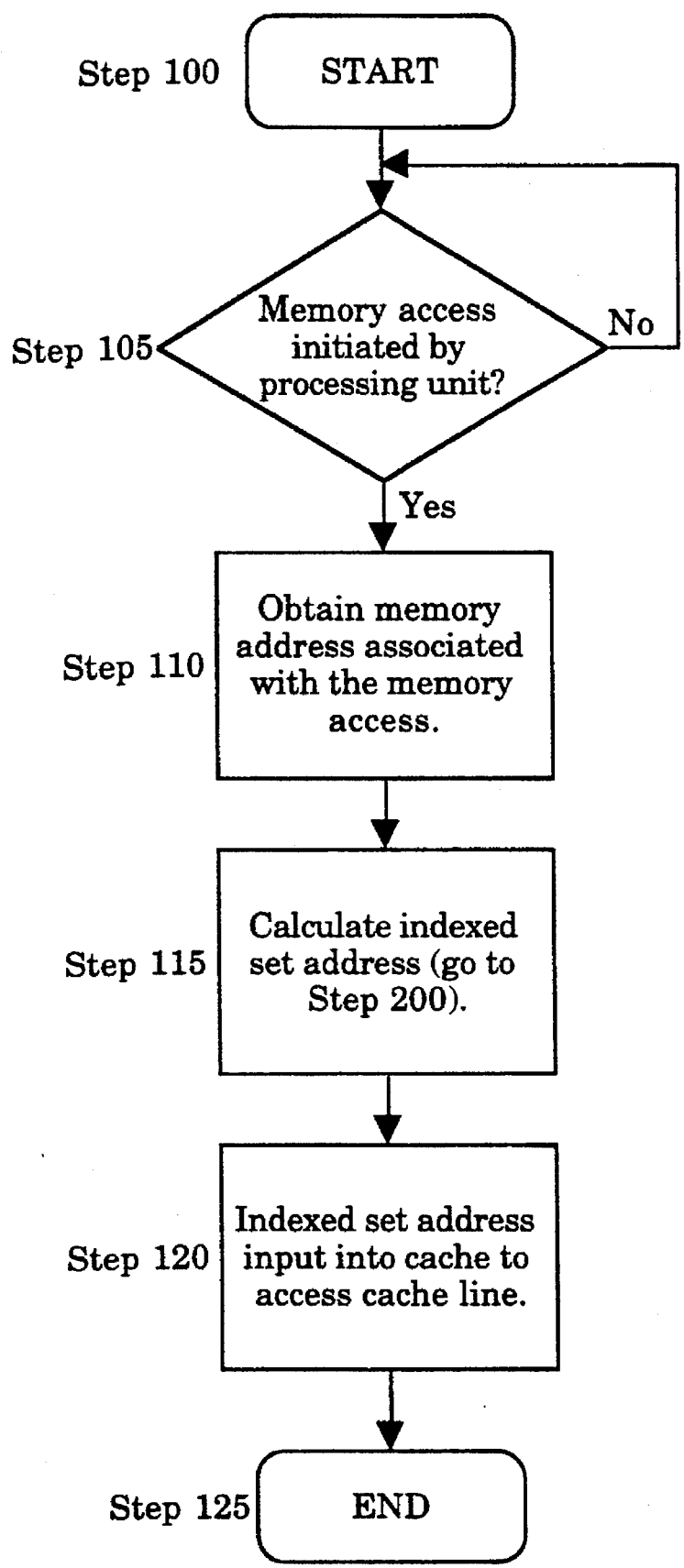
FIG. 2a is an illustrative flowchart of the general operations of the logic circuitry to function collectively with the processor sub-system in completing an memory access.
Figure 2B:
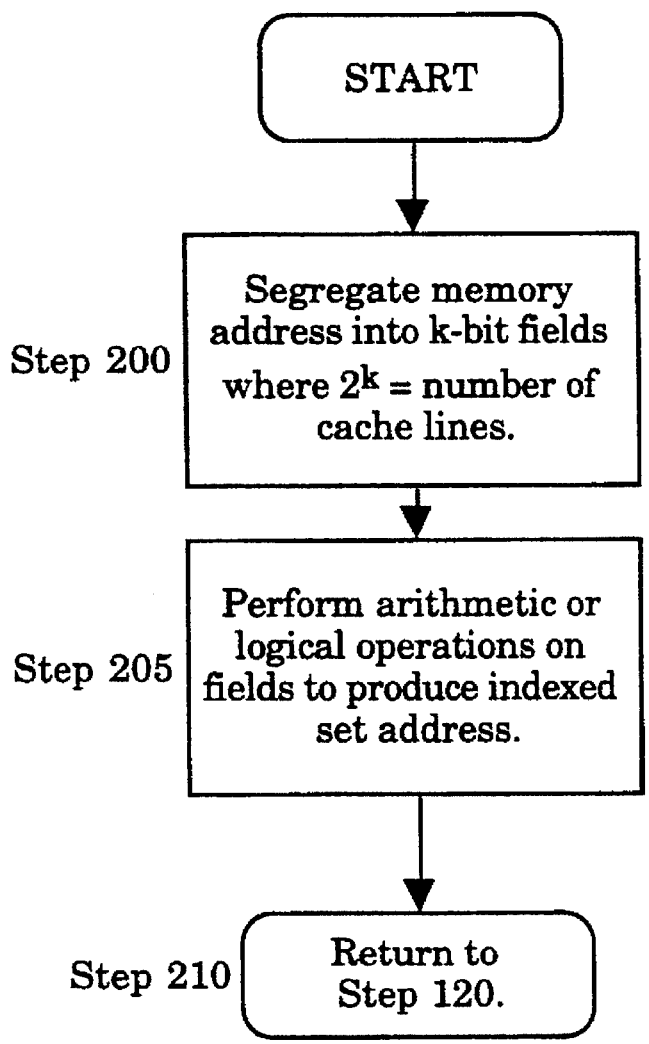
FIG. 2b is an illustrative flowchart of the general operations performed the logic circuitry to produce the indexed set address.

As shown in FIGS. 2a and 2b, a general procedure undertaken by the logic circuitry in calculating the indexed set address for any cache size through arithmetic operations is shown. Referring to FIG. 2a, the first step is to monitor the address lines between the processor sub-system and the cache to determine if a memory access is initiated by the processing unit (Step 105). If so, the memory address associated with the memory access is received by the logic circuitry (Step 110). Next, in Step 115, the logic circuitry computes the indexed set address by performing operations having the same effect as a modulo operation using as a modulus a Mersenne pseudo-prime number "P" being equal to the number of cache lines ("$2^k$") supported by cache minus one (i.e., $P=2^k-1$.)

Referring now to FIG. 2b, in calculating the indexed set address, an operation emulating a modulo operation using a modulus "P" is performed on the memory address to derive the indexed set address. This operation involves segregating the memory address into fields of "k" bits in width, excluding a number "n" of least significant bits necessary for uniquely addressing each byte with the cache line (Step 205). In the event that a field does not include "k" bits (mostly the field associated with the most significant bits), the field is still used for the arithmetic calculation (see FIG. 2c). In step 210, arithmetic operations are performed on the fields of "k" bits to produce the indexed set address.

Referring back to FIG. 2a, after calculating the indexed set address, it is input into the cache to access the corresponding cache line (Step 120). It is contemplated that in lieu of performing arithmetic operations on the fields of "k" bits in Step 210, addition by "Galios Held of 2" (i.e., Exclusive-Or'ing) could be performed.

Figures 1, 2C:
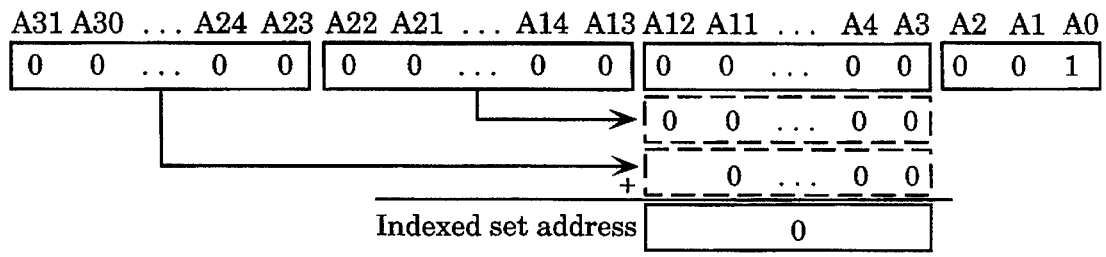
FIG. 2c is a pair of logic tables illustrating how the indexed set address for an arbitrarily chosen byte element is calculated in a predefined microprocessor system.
Figures 2, 2C:
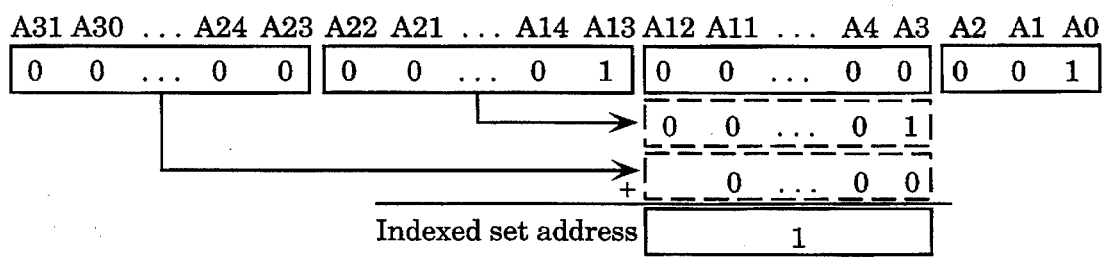

In order to clarify the operations of the present invention, the specific example has been created and as previously stated should not be construed in any way as a limitation on the scope of the present invention. Referring to FIG. 2c, the cache memory is chosen as 8 KByte in size (i.e., $2^{13}$ or 8,192 bytes) with each cache line consisting of 8 bytes. Thus, three (3) address bits of the memory address are reserved as byte selects to uniquely address each byte of the cache line and ten (10) address bits are used for uniquely addressing $2^{10}$ (or 1,024) cache lines.

In order to calculate the indexed set addresses of a plurality of successive memory accesses, for example, a first byte and a $(8,193)^{rd}$ byte of a program stored in main memory at addresses "01" and "8193". The binary representation of the memory address for the first byte is segregated into one 9-bit field and two 10-bit fields starting from bit A3 since three bits A[2:0] are necessary for byte select. It is contemplated that the memory address is divided accordingly because the microprocessor system only supports 32-bit addresses. The 9-bit field and two 10-bit fields of the memory address are arithmetically added together to produce the indexed set address. Since the indexed set address is equivalent to the original set address portion of the memory address, no offset is imposed. Thus, as expected, a first cache line of the cache memory would be accessed to perform an operation associated with the first byte.

Thereafter, the binary representation of the memory address for $8,193^{rd}$ byte also is segregated into a 9-bit field and two 10-bit fields starting from bit A3. These fields are arithmetically added together to produce the indexed set address which is shown to be equal to "1". Thus, the memory access is offset to utilize the second cache line of the cache memory, contrary to the Bit-Selection technique which would have accessed the first cache line and caused a conflict miss.

Thus, it is clear that for each access separated by "m" multiples of the cache size according to the memory address, the indexed set address is incremented by "m" for accessing the cache in a staggered fashion. Although the above-discussed method can be used for indexing any set address to produce an indexed set address less likely to cause a conflict miss, it is contemplated that the logic circuitry could be configured to perform less extensive calculations and still produce the desired indexed set addresses. For example, in viewing FIG. 2c, it is clear that only performing arithmetic operations between the two 10-bit fields would still produce the same result.

Figure 3A:
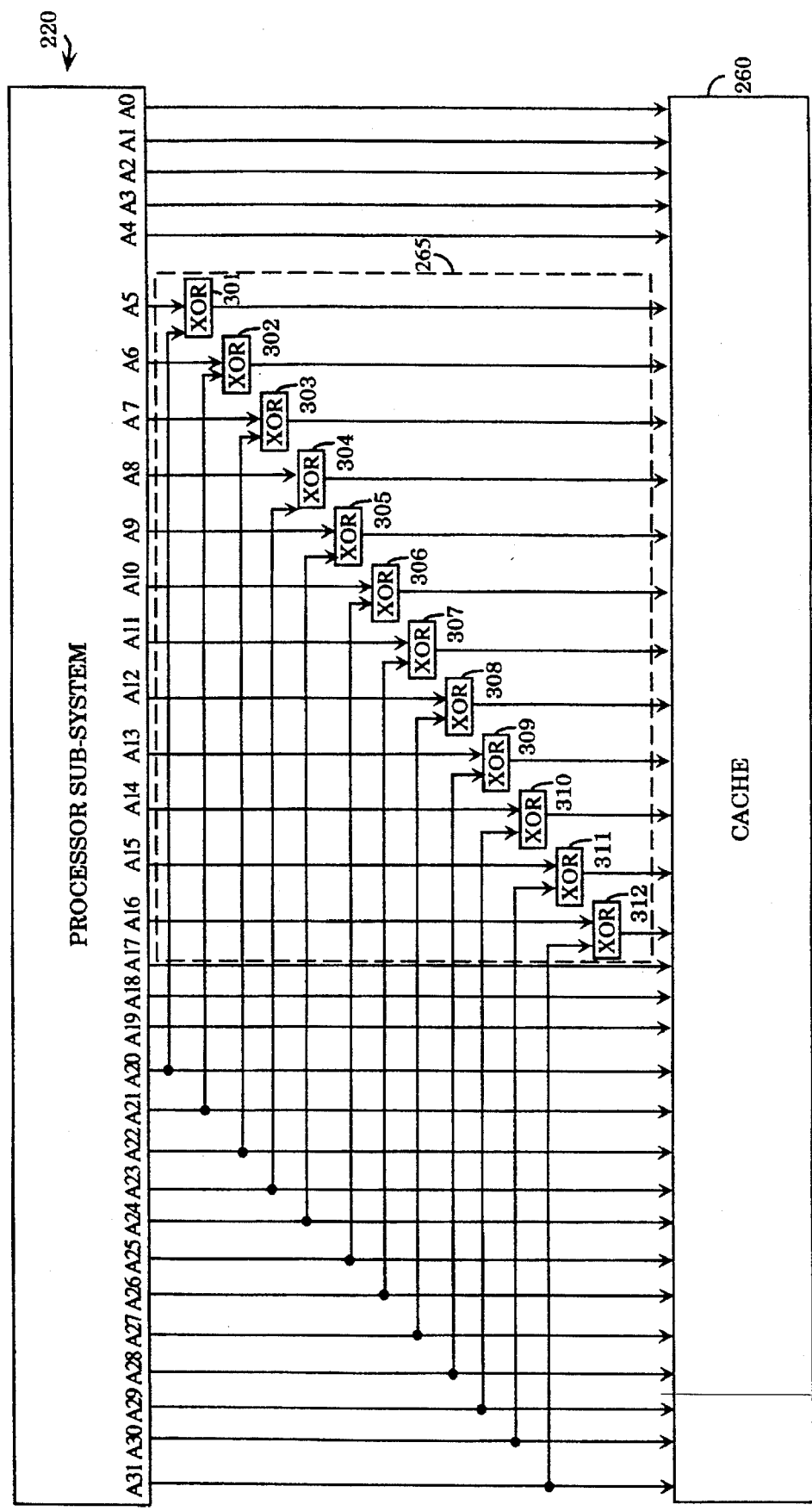
FIG. 3a is one embodiment of the logic circuitry utilizing parallel logic gates to generate the indexed set address.

Referring now to FIG. 3a, an illustrative embodiment of the logic circuitry performing the indexing is illustrated where a 32-bit memory address ("A[31:0]") is generated by the processor sub-system 220. The 32-bit memory address is divided into three binary groupings: (i) tag bits "A[31:20]" of the tag address for performing hit/miss and other cache policies; (ii) set bits "A[19:5]" of the set address for indexing the cache lines; and (iii) byte select bits "A[4:0]" for uniquely addressing each byte in a cache line. Based on the proposed memory address configuration, the cache would be configured as a 1 MByte cache 260 includes 32-byte cache lines. It is contemplated, however, that the logic circuitry 265 can be slightly altered to conform with the chosen configuration of the system cache.

As shown in FIG. 3a, the logic circuitry 265 includes a plurality of logic gates 301–312 oriented in parallel to offset the set bits "A[16:5]" input into the cache while the most significant set bits "A[19:17]" remain unaffected since the address line is only 32-bits wide. Preferably, the plurality of logic gates 301–312 are dual-input XOR gates, although any logic gates providing identical functionality and minimal latency may be used. As shown, the first logic gate 301 is coupled to both the least significant set bit (i.e., A[5]) and the least significant tag bit (i.e., A[20]). The same coupling pattern continues until the most significant tag bit (i.e., A[31]) and A[16] are coupled to the logic gate 312.

Upon the processor sub-system 220 generating a memory address, the logic circuitry 265 appropriately offsets the set address to produce the indexed set address preventing conflict misses between successive memory accesses associated with an identical cache line.

Figures 1, 3B:
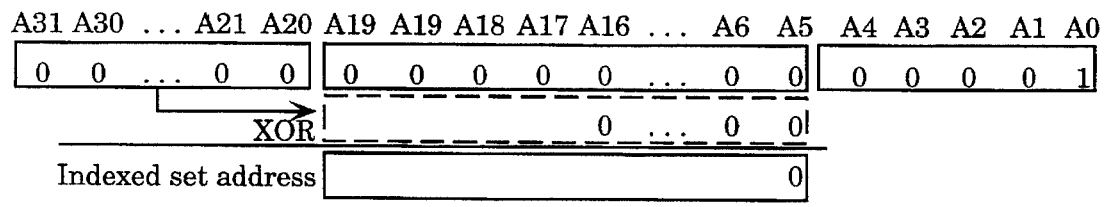
Figures 2, 3B:
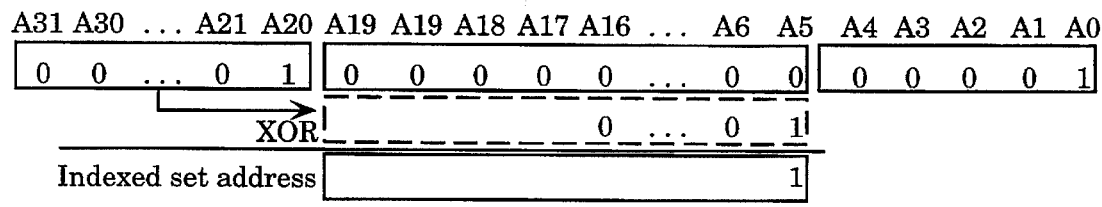
Figures 3, 3B:
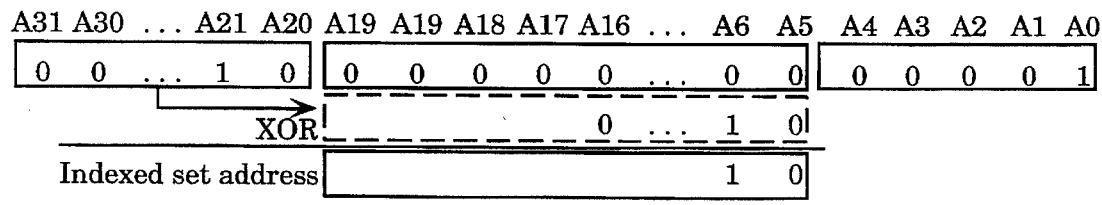

As shown in FIG. 3b, logic tables are shown illustrating the calculations undertaken by the logic circuitry of FIG. 3a to produce the indexed set address for three bytes of data each separated by the cache size. These logic tables illustrate that accesses are made to a first, second and third cache lines in lieu of repeated accesses to the first cache line as would have been performed by the Bit-Selection technique.

Figure 4A:
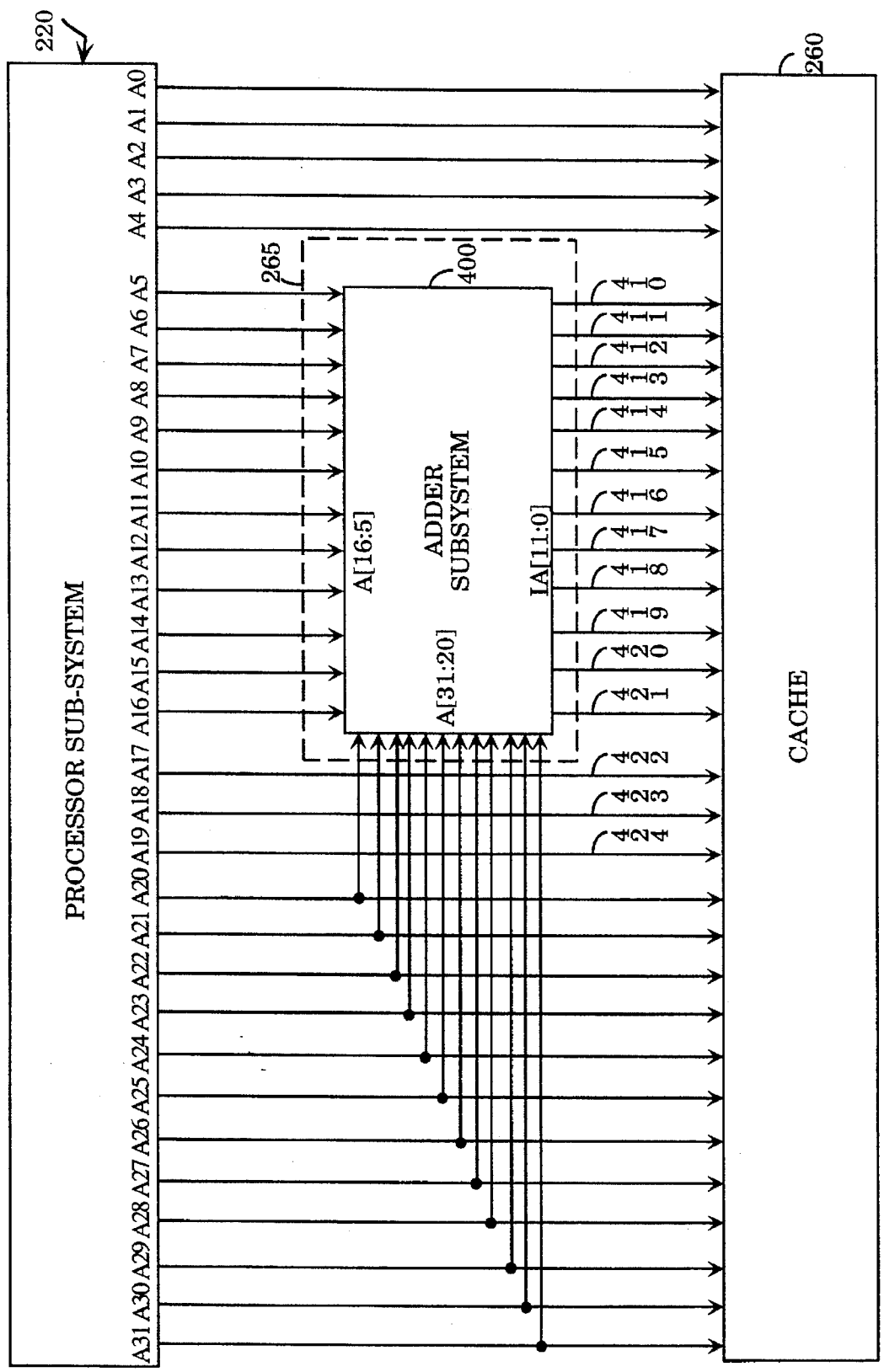
FIG. 4a is another embodiment of the logic circuitry utilizing an adder sub-system to generate the indexed set address.

Alternatively, as shown in FIG. 4a, it is contemplated that the logic circuitry 265 may include an adder sub-system 400 in lieu of a number of XOR gates oriented in parallel. It is contemplated that the adder sub-system 400 may include a full adder, a half adder or any other logic circuitry which will allow it to perform arithmetic operations without significant latency. The adder sub-system receives two separate address groups of inputs A[16:5] and A[31:20]. Each input of a first address group (A[16], A[15], . . ., A[5]) is added to its corresponding input of a second address group (A[31], A[30], ..., A[20]) to produce a third address group "IA[14:0]". The third address group "IA[11:0]" and the A[19:17] bits of the set addresses are transferred to the cache 260 via signal lines 410–424, respectively. These address bits namely A[19:17] and IA[11:0] collectively provide the indexed set address.

Figures 1, 4B:
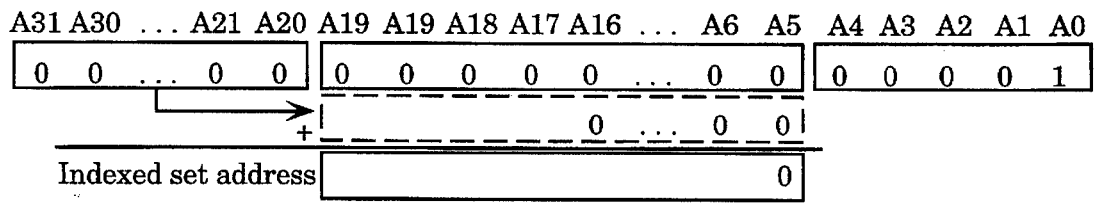
Figures 2, 4B:
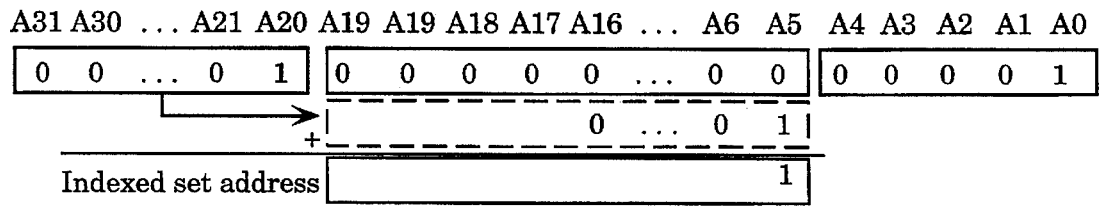
Figures 3, 4B:
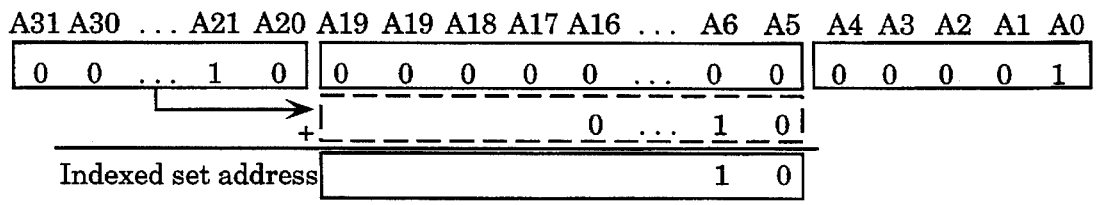

Referring now to FIG. 4b, logic tables for calculating the indexed set address for the three bytes of data using the logic circuitry of FIG. 4a are shown. These logic tables again illustrate that memory accesses to the cache would be made to a first, second and third cache lines in lieu of repeated accesses to the first cache line thereby avoiding two back-to-back conflict misses.

The present invention described herein may be designed in many different methods and using many different configurations. While the present invention has been described in terms of various embodiments, of her embodiments may come to mind to those skilled in the art without departing from the spirit and scope of the present invention. The invention should, therefore, be measured in terms of the claims which follows.

What is claimed is:

1. A microprocessor system comprising:
    a bus;
    a memory sub-system coupled to said bus, said memory sub-system including a cache element which includes cache memory having a plurality of cache lines each indexed by a set address;
    a processor sub-system coupled to said bus, said processor sub-system transfers a memory address, including a set address and a tag address, to the cache element in order to request access to one of said plurality of cache lines; and
    logic circuitry coupled to the cache element and the processor sub-system, said logic circuitry includes a plurality of logic gates arranged in parallel so that each of the logic gates receives as input a bit of the tag address and a corresponding bit of the set address so that the plurality of logic gates collectively produce an output result, said logic circuitry performs an indexing scheme in which the set address of the memory address is offset in order to produce an indexed set address, said indexing scheme being equivalent to performing a modulo operation on the memory address using a Mersenne pseudo-prime number as a modulus.

2. The microprocessor system according to claim 1, wherein said Mersenne pseudo-prime number is equal to a number represented by the plurality of cache lines employed within the cache memory minus one.

3. The microprocessor system according to claim 1, wherein said logic circuitry includes an adder sub-system for arithmetically adding, least significant bits first, a first group of bits of the tag address to a second group of bits of the set address to produce the output result, wherein
    (i) if the set address has a lesser or equivalent number of bits than the tag address, the indexed set address is equal to the output result, and alternatively
    (ii) if the set address has a greater number of bits than the tag address, the indexed set address is divided into a lesser significant portion including the output result and a more significant portion including at least one bit of the set address being more significant than the second group of bits of the set address.

4. The microprocessor system according to claim 3, wherein said the adder sub-system includes a full adder to receive the first group of bits of the tag address as a first operand and the second group of bits of the set address as a second operand.

5. The microprocessor system according to claim 1, wherein if the set address has a lesser or an equivalent number of bits than the tag address, the plurality of logic gates produce the output result as the indexed set address.

6. The microprocessor system according to claim 1, wherein if the set address has greater number of bits than the tag address, the plurality of logic gates collectively produce the output result to be used as a lesser significant portion of the indexed set address and any bits of the set address, being more significant than the bits of the set address used to produce the output result, are used as a more significant portion of the indexed set address.

7. The microprocessor system according to claim 1, wherein the plurality of logic gates are Exclusive-Or gates.

8. A logic circuit comprising a plurality of logic gates arranged in parallel so that each of the logic gates receives as input a bit of a tag address of a memory address and a corresponding bit of a set address of the memory address so that the plurality of logic gates collectively produce an output result, said logic circuit adapted for a system having a cache memory with a plurality of cache lines each indexed by the set address, for performing an indexing scheme in which the set address of the memory address, identical to a set address of a previously requested memory address sharing the same cache line of the cache memory as the memory address, is offset to produce an indexed set address, said indexed set address being equivalent to performing a modulo operation on the memory address using a Mersenne pseudo-prime number as a modulus.

9. The logic circuit according to claim 8 being an adder circuit system for arithmetically adding, least significant bits first, a first group of bits of the tag address of the memory address to a second group of bits of the set address of the memory address in order to produce the output result, wherein
    (i) if the set address has a lesser or equivalent number of bits than the tag address, the indexed set address is equal to the output result, and alternatively
    (ii) if the set address has a greater number of bits than the tag address, the indexed set address is divided into a lesser significant portion including the output result and a more significant portion including at least one bit of the set address being more significant than the second group of bits of the set address.

10. The logic circuit according to claim 8, wherein if the set address has a lesser or an equivalent number of bits than the tag address, the plurality of logic gates produce the output result as the indexed set address.

11. The logic circuit according to claim 8, wherein if the set address has greater number of bits than the tag address, the plurality of logic gates collectively produce the output result to be used as a lesser significant portion of the indexed set address and any bit of the set address, being more significant than the bits of the set address used to produce the output result, are used as a more significant portion of the indexed set address.

12. The logic circuit according to claim 8, wherein the plurality of logic gates are Exclusive-Or gates.

13. A method for computing cache indexes of cache memory in order to avoid cache collisions, the method comprising the steps of:
    receiving a memory access request for utilizing a memory location associated with a memory address including at least one byte select bit;
    segregating the memory address, excluding the at least one byte select bit, into a plurality of fields having bit width equivalent to $\log_2(n)$, where n is a number of cache lines of the cache memory; and performing arithmetic operations on the plurality of fields using a plurality of logic gates arranged in parallel so that collectively an indexed set address for indexing the cache memory is produced.

14. The method according to claim 13, wherein said arithmetic operation completed in the performing step involves adding the plurality of fields together using carry generation to produce the indexed set address.

15. The method according to claim 13, wherein said arithmetic operation completed in the performing step involves logically Exclusive-Or'ing the plurality of fields together to produce the indexed set address.

* * * * *